United States Patent Office 3,362,745
Patented Jan. 9, 1968

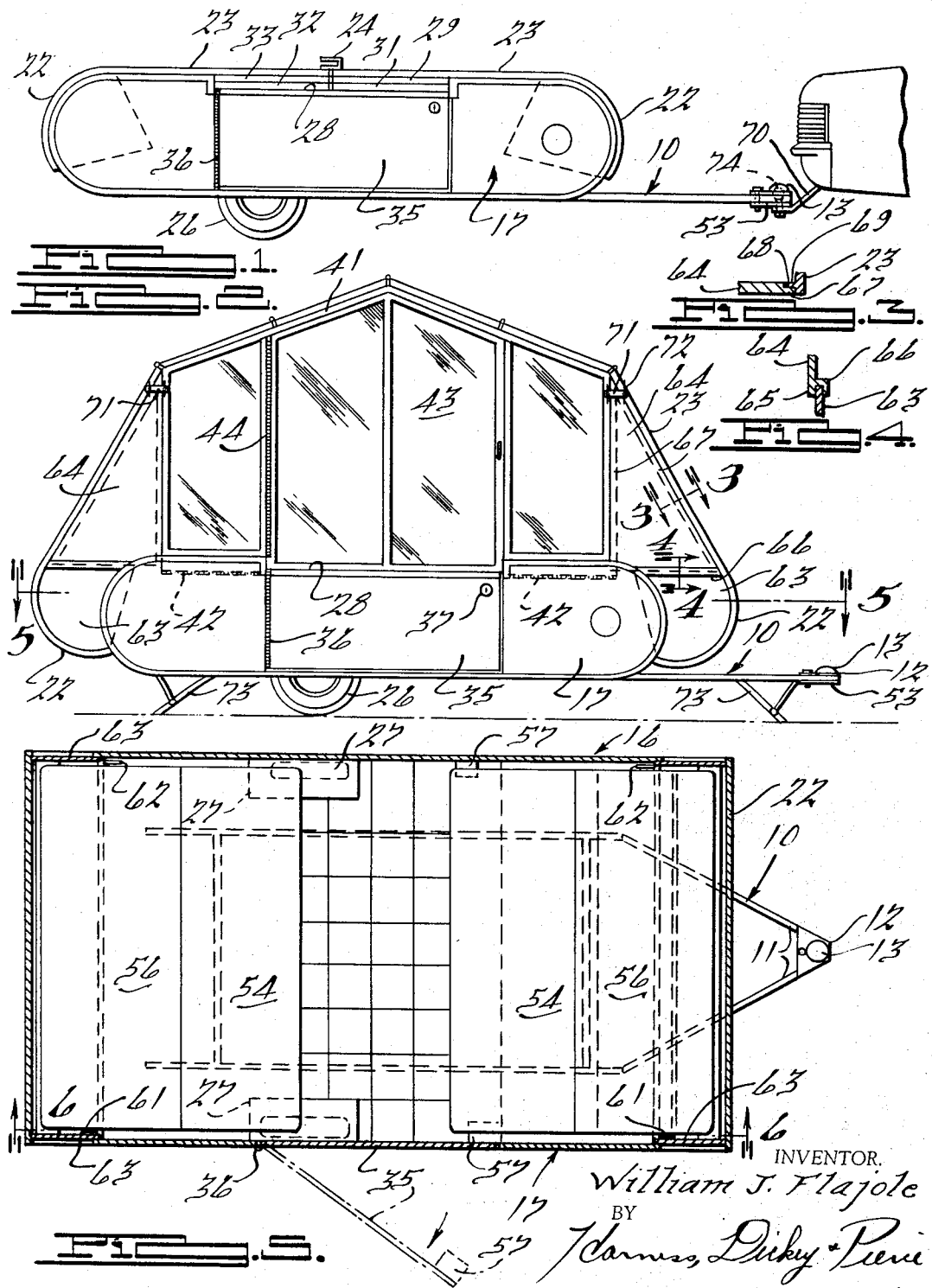

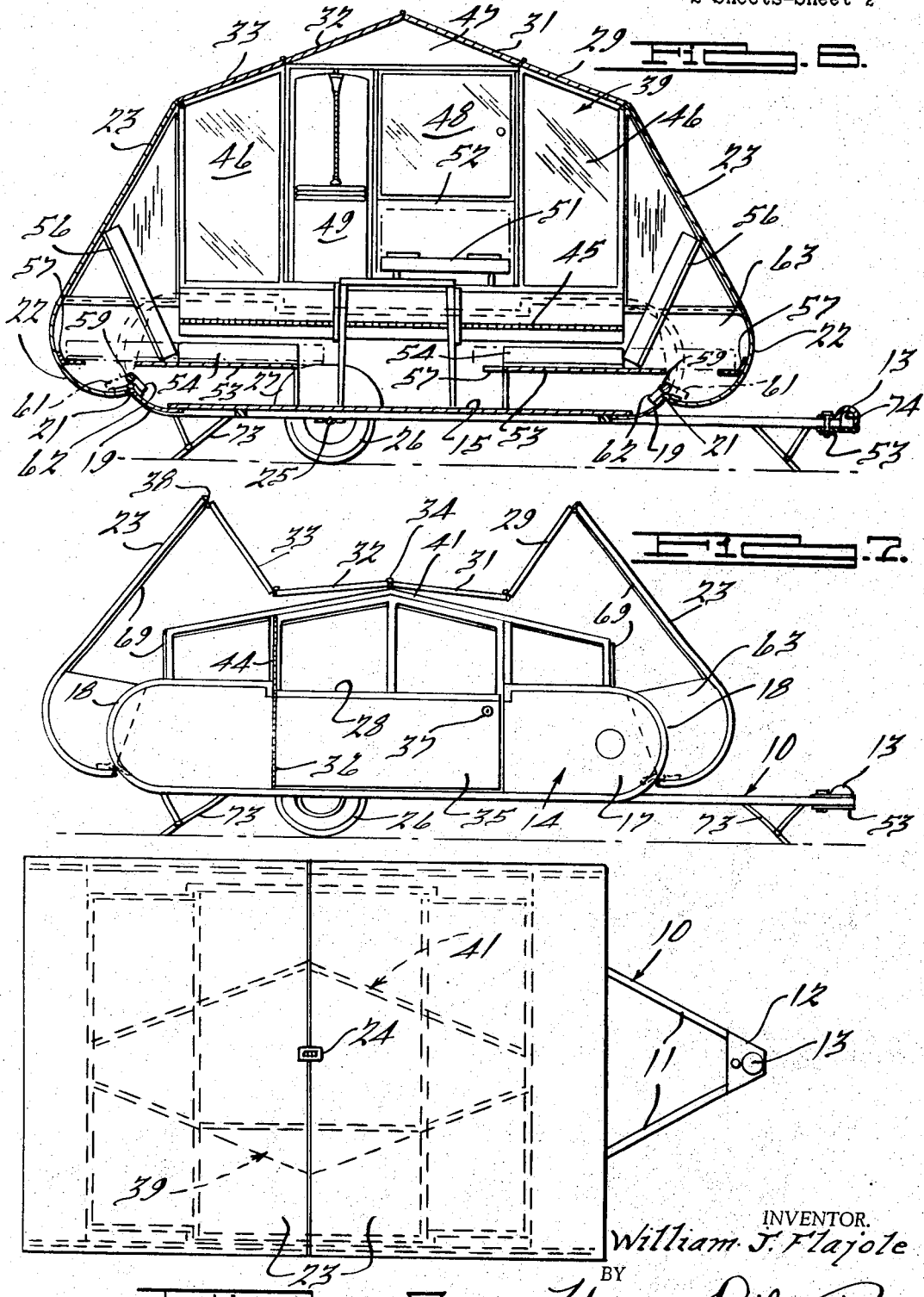

3,362,745
CAMPING TRAILER
William J. Flajole, Beverly Hills, Mich.
(20650 Breezewood, Birmingham, Mich. 48010)
Filed Apr. 19, 1966, Ser. No. 543,578
7 Claims. (Cl. 296—23)

ABSTRACT OF THE DISCLOSURE

A camper trailer is constructed as a complete unit having a carrier body mounted on wheels provided with pivoted end sections which form a cover for the carrier body when in horizontal aligned relation. In this position hinge panels overlap each other beneath the adjacent portions of the end sections to which they are pivotally secured in a manner to form the roof of the carrier body when the end sections are in raised position.

---

The camping trailer of the present invention comprises a chassis frame having a front extension containing a socket for receiving a ball on a hitch carried by a pulling vehicle. A trailer body has a bottom and two side walls supported by the chassis frame. Top and end closure members are pivoted at each end of the bottom. Four panels are pivoted together and to the adjacent edges of the closure members which when the closure members are swung outwardly span the area therebetween to form the roof of the camper. Two side wall sections are pivoted to the side walls of the trailer body to be swung upwardly in extension of the side walls and into engagement with the four top panels. Triangular shaped filler panels are applied to the corners between the end of the extending side wall sections and the closure members. One of the side wall sections has a hinged door therein in extension of a door in the trailer side wall so that ingress is provided to the box when in trailer position and into the trailer when in camper position. The opposite wall may have an extending frame thereon as receptacles for clothes, medicine cabinet, a stove and the like. Supports are provided at each end of the trailer body for box spring mattress sections which may lay flat in bed position or which may have one of the elements in tilted back position to form seating structure at each end of the trailer leaving a space therebetween for a table or the like.

Accordingly, the main objects of the invention are: to provide a camper trailer with a trailer body having the forward, rearward and top closure elements hinged at the bottom so that the top panel sections can be swung upwardly to form end walls with pivoted panel sections therebetween which form the top roof portion of the camper; to provide wall extensions for the side walls of the trailer body which are hinged to the inner surface thereof and which swing upwardly in extension of the body wall into engagement with the hinged panels between the front and rear wall sections; to provide a camper trailer employing metal and glass panels which are hinged together both in traveling and camping positions, and in general provide a camping trailer which is simple in construction, readily expanded from trailer to camping positions, and which is economical of manufacture.

Other objects and features of novelty of the invention will be specifically pointed out or will become apparent when referring, for a better understanding of the invention, to the following description taken in conjunction with the accompanying drawings, wherein:

FIGURE 1 is a view of a camper trailer embodying features of the present invention hitched to the rear of a pulling vehicle;

FIG. 2 is a view of the structure illustrated in FIG. 1, when expanded into camper position;

FIG. 3 is an enlarged broken sectional view of the structure illustrated in FIG. 2, taken on the line 3—3 thereof;

FIG. 4 is an enlarged broken sectional view of the structure illustrated in FIG. 2, taken on the line 4—4 thereof;

FIG. 5 is a sectional view of the structure illustrated in FIG. 2, taken on the line 5—5 thereof;

FIG. 6 is a sectional view of the structure illustrated in FIG. 5, taken on the line 6—6 thereof;

FIG. 7 is a view of the structure illustrated in FIG. 2, with the panels partially moved toward camper position, and FIG. 8 is a plan view of the structure illustrated in FIG. 1 when in carrying position.

The camper trailer of the present invention has a chassis frame 10 with diverging front sections 11 which form a support 12 for a ball receiving socket 13. A trailer body 14 has a floor 15 which is secured to the chassis frame 10. Side walls 16 and 17 are supported on the floor 15 with the ends 18 terminating in an arc of 180°. The lower portion of the arcuate side walls is filled in by an arcuate panel 19 having a hinge 21 extending between the side walls. An arcuate end 22 of the trailer body closure panel 23 is pivoted by the hinge 21. The arcuate ends 22 extends over and conforms with the arcuate ends 18 of the side walls 16 and 17. The ends of the closure panels 23 abut at the center of the trailer body 14 where they are secured by at latch 24. An axle 25 is secured to the chassis frame 10 for supporting a pair of wheels 26 which are disposed within wheel housings 27 extending within the body 14. The side walls 16 and 17 are recessed in the central portion at 28 for receiving four central panels 29, 31, 32 and 33. These panels are secured together by piano-type hinges 34 which permit the panels 31 and 32 to drop downwardly into the recesses 28 in each side wall after which the panels 29 and 31 will fold thereover as the ends of the panels 23 move into abutting relation and latched position. The side wall 17 has the wall beneath the notch 28 formed into a door 35 secured in position by a hinge 36 and a lock 37. The door may be open when the trailer body is folded in carrying position to permit the storage of luggage, materials and the like, for transportation. It is to be understood that sealing strips 38 are provided between the panels 23, 29, 31, 32 and 33 to form a watertight joint between the hinge edges when in camping position and in carrying position.

Wall extensions 29 and 31 fill the space between the side walls 16 and 17 of the trailer body and the panels 29 to 33, as illustrated in FIGS. 2 and 6. As illustrated in FIG. 2, the panel portion 41 is secured by hinges 42 to the inner side of the side wall 17 on a line below the notch 28 and above the door 35. The entire section 41 is swung upwardly on the hinges 42 to have a central door section 43 disposed in extension of the door 35. The door 43 is supported on a hinge 44 aligned with the hinge 36 for the door 35. With this arrangement the door portion 43 and the door portion 35 may be swung open so that a person can step into the camper on the floor 15. The wall extension 39 has a hinge 45 dropped downwardly below the notch 28 so that after the panel has been swung down into the body 14 in horizontal position, the wall extension 41 may hinge down on the top thereof with both panels below the notches 28 which are free to receive the four panels 29 to 33. The wall extension 39 has two windows 46 on opposite sides of a central panel 47 which supports a medicine chest 48, a garment recess 49 and a cooking stove 51 which can be swung downwardly from a recessed position as shown in dot and dash line 52. A support 53 is provided each side of the door opening for a pair of foam or spring pads 54 having a solid back 55.

When in seating arrangement, a rearmost pad 56 is placed in seat-back position, as illustrated in FIG. 6. When the pads 54 and 56 are employed as a bed, the pad 54 moves forwardly to permit the pad 56 to drop downwardly and rest upon the support 53 and an angle frame member 57 secured to the arcuate ends 22 of the panel sections 23. The forward end of the left-hand pad 54 rests upon the adjacent wheel housing 27. The pad 54 on the righthand side of the trailer body as illustrated in FIG. 6, has shelf-like blocks 57 on the side walls on which the pad 54 rests when moved forwardly into bed position.

A torsion bar 59 is mounted adjacent to the hinge 21 with one crank arm 61 engaging the arcuate portion 22 and the other crank arm 62 engaging the arcuate section 19 to which the elongated central part of the bar is secured. Upon the closing of the panel sections 23, movement of the arm 61 along with the section 22 tensions the bar so that a force will be exerted thereby when the panels 23 are moved to raised position. The arcuate section 22 has a wall portion 63 which fills the area at each end of the arcuate section 22 to form an extension of the arcuate end portions 18 of the side panel when in camper position. Triangular filler panels 64 are employed for filling the openings between the ends of the sections 39 and 41 and the panel sections 23 and 63. The bottom edge 65 of the panel 64 has an extension 66 which forms a channel for receiving the upper end of the panel section 63 and the side edges 67 are notched at 68 to engage the projecting flange 69 of the panel section 23 and the end of the side wall extension 41. Suitable holding means maintain the panel in position such as the link 71 secured in position by thumb screws 72, hooks or the like. Outriggers 73 are mounted on the front and rear end of the chassis frame for stabilizing the camper when separated from the automobile. It will be noted in FIG. 1 that a pull bar 70 extends rearwardly from an automobile having a ball 74 thereon which is received by the socket 13 at the forward end of the chassis frame. A locking bar 75 is swung about the neck below the ball 74 to releasably secure the chassis frame to the pull bar 70.

What is claimed is:

1. In a camper trailer, a carrier body having a bottom and side walls, wheels supporting said body, end sections disposed in aligned relation when enclosing the top of the carrier body, top panels pivoted to each other and to the adjacent ends of the end sections and hinge means for securing the remote ends of the end sections to the forward and rear end of the body.

2. A camper trailer as recited in claim 1 wherein four top panels are employed which are hinged to each other and to the ends of the end walls for forming the end walls and roof when the trailer is in camper position.

3. In a camper trailer as recited in claim 2 wherein wall extensions are pivoted to the side walls of the carrier body for movement from a horizontal nested overlapped relation within the carrier body to a vertical position in extensions of the trailer side walls and in engagement with said four panels.

4. In a camper trailer as recited in claim 3 wherein filler panels are employed to close the area between the raised end sections and the wall extensions.

5. A camper trailer as recited in claim 2 wherein spring means are employed for assisting in raising the end sections and the hinged panels therebetween.

6. In a camper trailer as recited in claim 3 wherein a door is provided in one of the trailer's side walls and in the wall extension thereof which can be operated together and independent of each other.

7. In a camper trailer as recited in claim 1, wherein the pivoted ends of the front sections close the front and rear ends of the carrier body when the sections are in aligned relation.

References Cited

UNITED STATES PATENTS

| | | | |
|---|---|---|---|
| 2,714,524 | 8/1955 | Swiggum | 296—23 |
| 2,837,778 | 6/1958 | Kern | 296—23 |
| 3,288,521 | 11/1966 | Patnode | 296—23 |

LEO FRIAGLIA, *Primary Examiner.*

PHILIP GOODMAN, *Examiner.*